United States Patent [19]

Hansel

[11] E Re. 30,050

[45] Reissued Jul. 24, 1979

[54] INTERLOCK SYSTEM FOR A GASOLINE DISPENSING NOZZLE

[75] Inventor: William B. Hansel, Media, Pa.

[73] Assignee: Suntech, Inc., Philadelphia, Pa.

[21] Appl. No.: 918,620

[22] Filed: Jun. 23, 1978

Related U.S. Patent Documents

Reissue of:

[64] Patent No.: 4,011,897
Issued: Mar. 15, 1977
Appl. No.: 635,189
Filed: Nov. 25, 1975

[51] Int. Cl.[2] ..... B65B 57/06

[52] U.S. Cl. ..... 141/207; 141/208

[58] Field of Search ..... 141/1–8, 141/44–59, 93, 206–229, 346–359, 383–386, 392; 220/85 VR, 85 VS, 86 R

[56] References Cited

U.S. PATENT DOCUMENTS 3,502,121 3/1970 Moore et al. ..... 141/207

3,911,973 10/1975 Casteline ..... 141/207

FOREIGN PATENT DOCUMENTS 1210922 11/1967 United Kingdom .

*Primary Examiner*—Houston S. Bell

*Attorney, Agent, or Firm*—J. Edward Hess; Donald R. Johnson; Paul Lipsitz

[57] ABSTRACT

A dispensing nozzle assembly having a system for receiving the vapors displaced from a motor vehicle gasoline tank when it is being filled and an interlock system located in conjunction with the latching collar on the discharge spout of the nozzle, for preventing the dispensing of gasoline until the discharge spout is inserted into the vehicle fillpipe. The interlock system includes a valve mounted in the discharge spout in such a manner that it is actuated by the weight of the nozzle resting upon the fillpipe inlet. The valve is interconnected with the automatic shut-off system of the nozzle so that when the valve is in its open position, signifying that the nozzle is properly inserted in the fillpipe, dispensing of gasoline is permitted.

5 Claims, 5 Drawing Figures

INTERLOCK SYSTEM FOR A GASOLINE DISPENSING NOZZLE

Matter enclosed in heavy brackets [ ] appears in the original patent but forms no part of this reissue specification; matter printed in italics indicates the additions made by reissue.

CROSS REFERENCE TO RELATED APPLICATIONS

This application is related to copending applications entitled "Gasoline Dispensing Nozzle With Vapor Receiving System", Ser. No. 609,760, filed Sept. 2, 1975 *and now abandoned,* and "Attitude Valve for a Gasoline Dispensing Nozzle With a Vapor Receiving System", Ser. No. 609,761, filed Sept. 2, 1975 *and now U.S. Pat. No. 4,058,149.*

BACKGROUND OF THE INVENTION

This invention relates to nozzles for dispensing gasoline into vehicle fuel tanks and more specifically to an interlock system to prevent dispensing of gasoline until the discharge spout of a nozzle is inserted into the vehicle fuel pipe.

Current environmental regulations will require in some areas that gasoline vapors displaced from a vehicle fuel tank while being filled are to be recovered in order to prevent their escape into the atmosphere. As part of these requirements, it is foreseeable that an interlock system may be required at some time in the future to prevent the dispensing of gasoline until the vapor receiving system is in contact with the vehicle fuel tank. Even if such a requirement never materializes, it is still desirable to have such an interlock system to encourage the filling station operator to have the vapor receiving system properly in place against the fillpipe.

The prior art has shown many designs for providing such an interlock system. One common method is to use a mechanical linkage between the face seal of the vapor receiving system and the automatic shut-off system within the nozzle housing itself. This type of a system tends to become overly complicated and adds to the weight of the nozzle as well as to the cost of construction and maintenance. Other designs include a valve located within the discharge spout and connected to the vent line which leads to the automatic shut-off system in the nozzle housing. This valve is then connected to the vapor receiving system in such a manner that it is closed when the vapor receiving system is not in contact with the vehicle fillpipe, thereby preventing the dispensing of gasoline. While this particular design is capable of working, it has at least one drawback in that the linkage mechanism between the valve and the vapor receiving system can greatly limit the flexibility of the vapor receiving system itself, thereby increasing the possibility of not obtaining a tight seal against the vehicle fillpipe.

Preferably, such an interlock system should be designed in a way that does not interfere with the movement of the vapor receiving system so that a tight seal is formed reliably each time the nozzle is inserted into the fillpipe. Also, its design should be simple to permit ease of operation as well as to minimize manufacturing costs. The interlock system should also be designed so that it operates automatically during normal use of the nozzle, but also permits a manual overriding of the system for filling tanks with unusual fillpipe designs.

SUMMARY OF THE INVENTION

In accordance with a preferred embodiment an interlock system is provided which disables the dispensing nozzle until the discharge spout is fully inserted within the fillpipe of a vehicle gasoline tank. The relationship between the location of the interlock system and the vapor receiving system is such that by virtue of having the discharge spout fully inserted within the fillpipe, the vapor receiving system must, by its own design, be in contact also with the fillpipe of the vehicle. The interlock system disclosed herein includes an interlock valve mounted in conjunction with the latching collar on the discharge spout. The interlock valve is connected within the vent line leading to the automatic shut-off system in the nozzle housing. The valve is designed so that it assumes a normally closed position and obtains an open position when the discharge spout rests on the fillpipe inlet.

This particular interlock system provides the advantages that it is actuated solely by the weight of the nozzle resting on the fillpipe and requires no added assistance by the operator, and does not interfere with the ability of the vapor receiving system to make a tight seal against the fillpipe. The small cost of such a system is evident from the simple design.

A better understanding of the invention and its advantages can be seen in the following description of the figures and preferred embodiment.

DESCRIPTION OF THE FIGURES AND PREFERRED EMBODIMENT

The interlock system described herein can be used on most of the nozzles that are commercially available today and with many of the vapor receiving systems available. However, an ideal nozzle and vapor receiving system, which is lightweight and particularly adaptable to such an interlock system, is that disclosed in U.S. Pat. No. 3,734,339 issued to Young and disclosed in a copending patent application entitled "Gasoline Dispensing Nozzle With Vapor Receiving System", by Hansel, filed Sept. 2, 1975, Ser. No. 609,761, respectively. Both are used herein for illustrative purposes.

Figure 1:
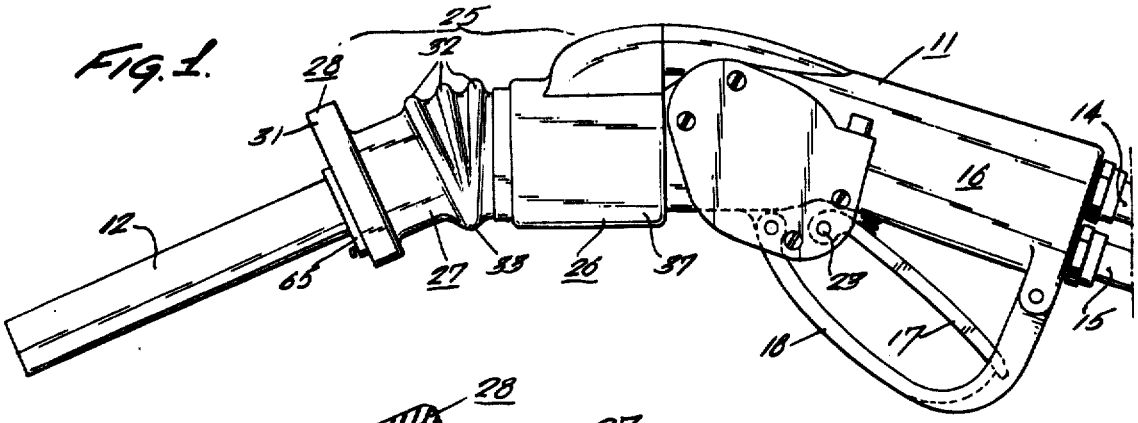
FIG. 1 is an elevational view of a dispensing nozzle having an interlock system according to this invention.
Figure 2:
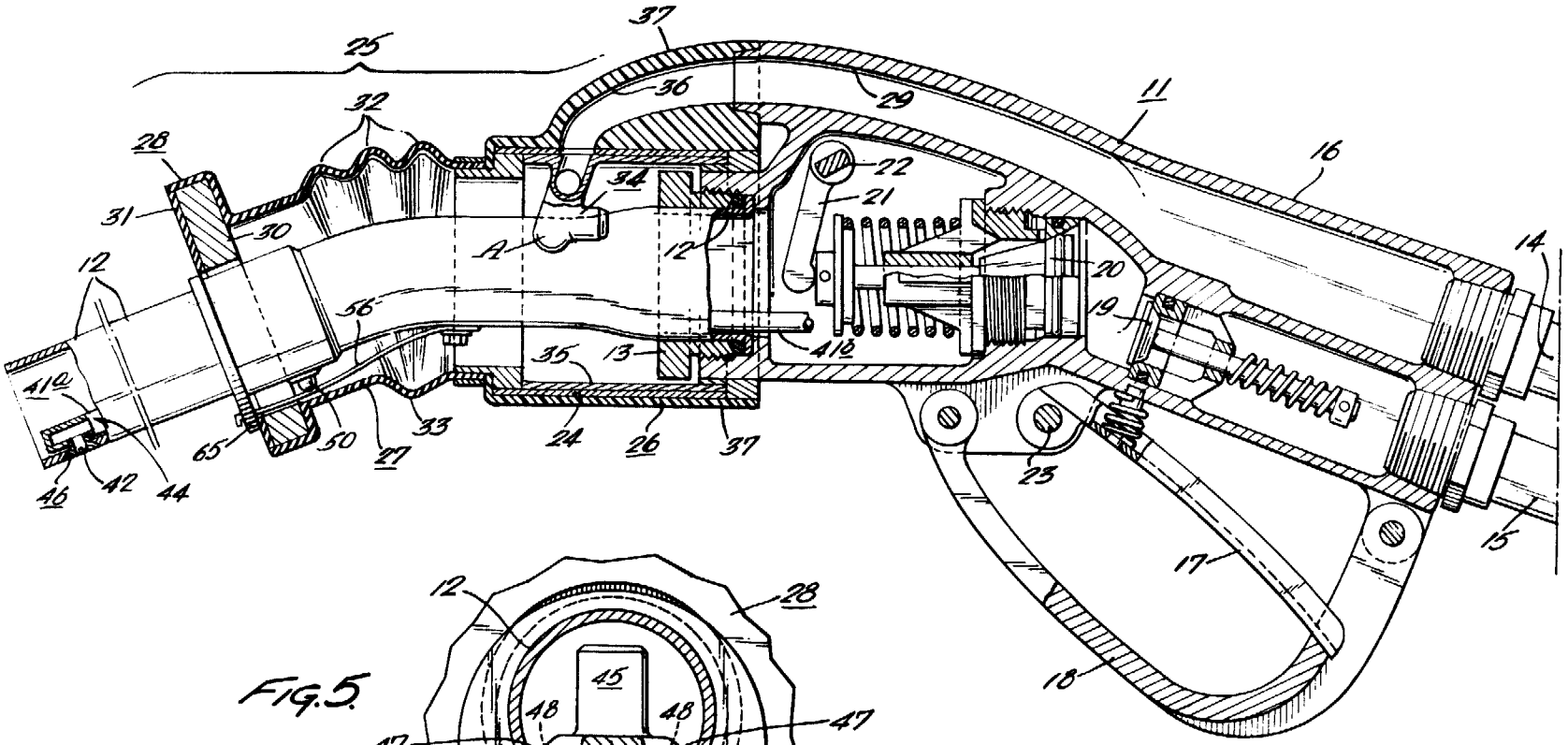
FIG. 2 is an enlarged view of the nozzle assembly of FIG. 1 shown in section.
Figure 5:
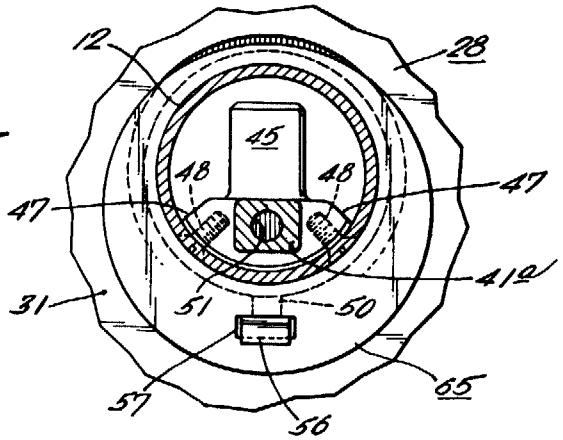
FIG. 5 is a transverse section taken along the line 5—5 in FIG. 3.

Referring to FIGS. 1 and 2, the nozzle assembly has a housing 11 with a discharge spout 12 connected thereto by retaining nut 13. Vapor return hose 14 and the gasoline hose 15 connect to handle portion 16 of housing 11. Operation of the nozzle is accomplished by squeezing lever 17 against handle 16. Guard 18 acts to protect actuating lever 17 as well as to provide a support for holding the nozzle when it is inserted into the pump housing for storage when not in use.

The components inside the nozzle include spring-loaded check valve 19, which serves as an anti-drain valve, and main poppet valve 20 for controlling the flow of gasoline through the nozzle. Rotation of operating arm 21 on shaft 22 toward main poppet valve 20 causes it to open. Shaft 22 is connected to pivot shaft 23 of lever 17 through an automatic shut-off mechanism (not shown) which prevents gasoline from being dispensed when the liquid level in the container reaches the end of spout 12. The shut-off mechanism can be a pressure responsive diaphragm system, the principles of which are well known. A more detailed explanation of the operation of this system is contained in U.S. Pat. No. 3,734,339, by Young.

A possible design for a vapor receiving system which is used for illustrative purposes and which is the subject matter of copending patent application entitled "Gasoline Dispensing Nozzle With Vapor Receiving System", Ser. No. 609,760, filed Sept. 2, 1975, will now be described. The vapor receiving system includes a vapor receiving chamber which is generally denoted by the number 25 and comprises three general sections, non-flexible housing 26, flexible bellows 27, and magnetic seal section 28. A vapor return passageway 29 extends from non-flexible housing 26, through nozzle housing 11 where it is connected to vapor return line 14.

The sectional view of the nozzle assembly with the vapor receiving system shown in FIG. 2 illustrates in detail its various components. Magnetic seal section 28 includes a magnetic disc 30 which has an opening large enough to permit spout 12 to pass through as well as to permit the vapors from a vehicle fuel tank to pass around spout 12 and through the opening. A soft rubber coating 31 covers the outside lateral face of magnetic disc 30, which contacts the fillpipe, so that a tight seal with the fillpipe is obtained.

Bellows 27 is designed to have sufficient stiffness for urging magnetic seal 28 against the fillpipe, but to be flexible enough to permit magnetic seal 28 to bend enough so that the proper angle for a tight seal on any particular fillpipe can be obtained. This balance between flexibility and stiffness is obtained in part by having a plurality of convolutions 32 on the upper portion which merges into one convolution 33 on the lower portion of bellows 27. An additional advantage to this bellows design is that the number of convolutions in the bellows can be minimized so that the surface area of the bellows subject to puncturing is also minimized.

Non-flexible housing 26 includes a rigid, cylindrical frame 24 which can be mounted directly on nozzle housing 11 without interferring with the normal installation of spout 12. Mounting of bellows 27 on the end of frame 24 can be accomplished by any suitable sealing method, such as by a snap ring, which is illustrated in FIG. 2. The use of a non-flexible housing also helps to reduce the length of bellows required so that the surface area of the bellows subject to puncturing is minimized.

Inside frame 24 of housing 26 is an attitude valve, 34, (see FIG. 2) formed as part of inner sleeve 35, which is in fluid communication with the top of the underground storage tanks (not shown) through vapor return hose 14, vapor return passageway 29 in nozzle housing 11, and outlet passsageway 36 of outer sleeve 37. Attitude valve 34 is used for preventing the vapors in the underground storage tanks from being displaced back into the atmosphere through vapor receiving chamber 25 when the nozzle is not in use and stored in an upright position on the pump. Valve 34 can be constructed as part of inner sleeve 35 so that it can be easily inserted inside frame 24 of housing 26. Inner sleeve 35 also permits the formation of an effective seal and provides the necessary supporting structure for the valve elements.

Valve 34 is illustrated and discussed in more detail in copending patent application entitled "Attitude Valve for a Gasoline Dispensing Nozzle With a Vapor Receiving System", by Hansel, Ser. No. 609,761, filed Sept. 2, 1975.

Most conventional gasoline dispensing nozzles use a balanced diaphragm shut-off system which acts in response to a pressure differential produced when the fillpipe in the vehicle gasoline tank becomes filled with gasoline. Such a system is also included in the nozzle of the above mentioned Young patent. As illustrated in the drawings, vent tube 41 travels through discharge spout 12 from opening 42 to one of the chambers on one side of the shut-off diaphragm (not shown). This side of the chamber is also connected to a venturi arrangement so that the flow of gasoline creates a vacuum on this side of the diaphragm which is relieved by having opening 42 in spout 12 open. However, when opening 42 is closed, such as by gasoline reaching the end of the spout, the vacuum from the venturi causes the shut-off diaphragm to disengage lever 17 so that gasoline can no longer be dispensed.

Figure 3:
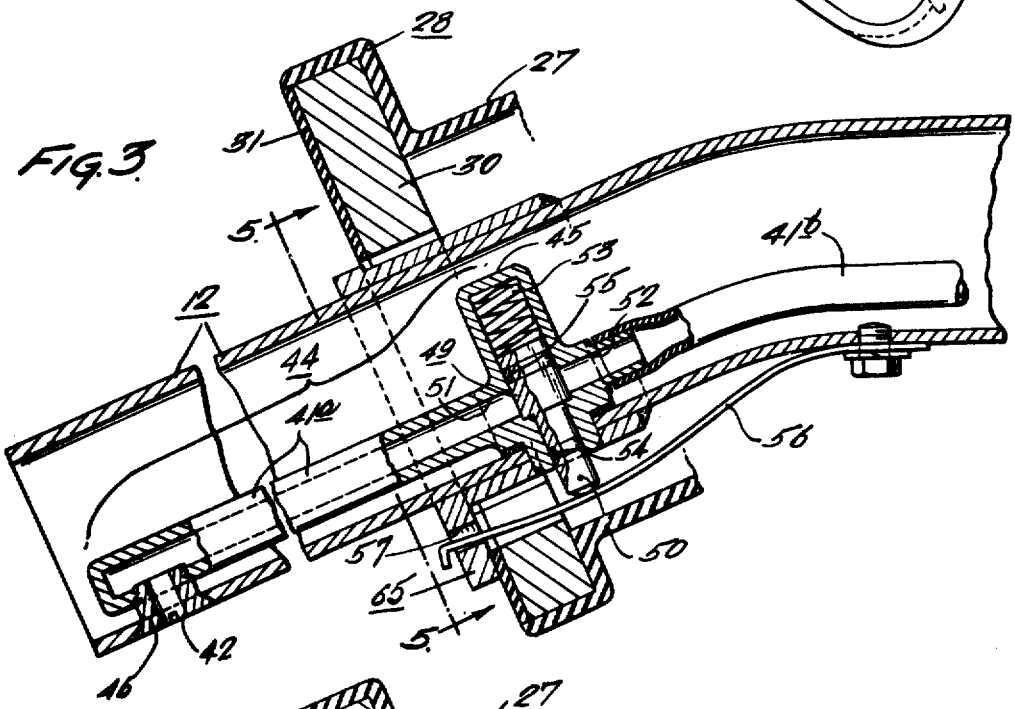
FIG. 3 is an enlarged fragmentary section through the discharge spout illustrating the interlock valve in its normally closed position.

A latching collar 65 is mounted on spout 12 at the location of magnetic seal 28 when bellows 27 is in its normal, relaxed position. The function of collar 65 is to connect spout 12 to the fillpipe of a vehicle, similar to that shown in FIG. 3, so that the nozzle will remain in position without the aid of its operator. An additional function of collar 65 is to prevent bellows 27 from being over extended when the nozzle is removed from the fillpipe, due to the magnetic attraction between the fillpipe and magnetic seal 28. Therefore, collar 65 is designed to have wide side extensions for contacting the surface of magnetic seal 28 to prevent over extension of bellows 27, a smaller bottom extension to catch the inside of the fillpipe, and a narrow top portion to permit sufficient flow of vapor around the collar and through the opening in magnetic disc 30, as is shown in more detail in the copending application entitled "Gasoline Dispensing Nozzle With Vapor Receiving System", by Hansel, Ser. No. 609,761.

The interlock system (see FIG. 3) can be designed to have a valve which is mounted on discharge spout 12 in conjunction with latching collar 65 The interlock system can include a rigid vent tube section 44 which comprises an interlock valve 45 and the end section, 41a, of the vent tube 41 at the outlet end of the discharge spout 12. A vent tube inlet screw 46, having an opening, 42, through its center, is used to secure end section 41a of vent tube section 44 to discharge spout 12. Side extensions 47 of the interlock valve housing receive screws 48 which secure both latching collar 64 and the valve end of vent tube 44 to discharge spout 12.

Interlock valve 45 has a cylindrical valve housing which contains a valve piston 49 having a diameter nearly equal to the inside of the valve housing. A valve stem 50 is connected to piston 49 and extends out of the valve chamber, through the lower end of the valve housing. The valve housing has two ports, 51 and 52, located directly opposite each other, with port 51 connected to vent tube section 41a and port 52 connected to vent tube section 41b. A coil spring 53 contained inside the valve housing acts to bias valve piston 49 in the closed position by placing the larger section between ports 51 and 52. "O" ring seals 54, 55 can be used to provide more efficient valve operation. As can now be seen, movement of valve piston 49 in the upward direction will bring the narrow valve stem, 50, in alignment with ports 51 and 52 in the valve housing, thereby permitting fluid to flow through the valve 45.

Figure 4:
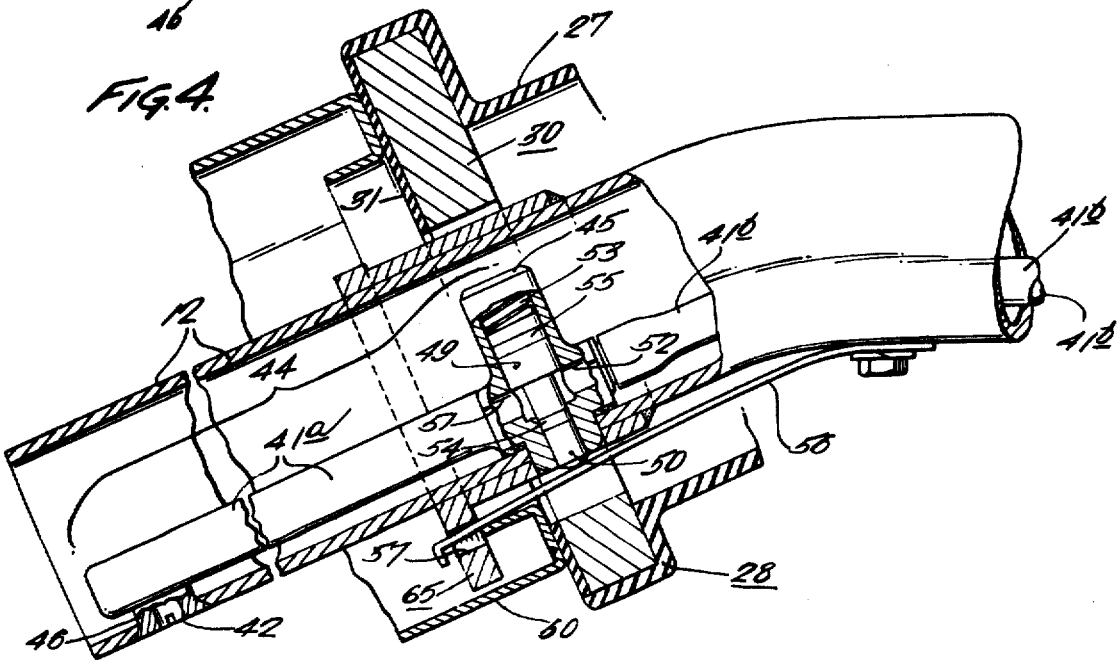
FIG. 4 is a fragmentary section of the nozzle illustrated in FIG. 3 showing the interlock valve in its open position and the spout latched in the fillpipe inlet.

Valve 45 is located in such a position so that when discharge spout 12 is inserted into a vehicle fillpipe, valve 45 obtains an open position by virtue of the discharge spout 12 resting on the inlet end of the vehicle fillpipe, 60 (as shown in FIG. 4). To assure better contact with valve stem 50 and fillpipe 60, a spring pressure plate 56 can be provided. One design of a pressure plate system is illustrated in the drawings. According to this design, pressure plate 56 is made out of a flat and elongated flexible material which is secured at one end to discharge spout 12 and the free end then passes through slot 57 in latching collar 65, so that it assumes a position near the end of valve stem 50 when the valve stem is in its closed position.

The location of interlock valve 45 also permits it to be easily overridden by the operator in the case of having to fill a tank which has a fillpipe that does not permit full insertion of the discharge spout. However, the operator will have to press valve 45 into the open position so that he can fill the fuel tank. This is easily accomplished by pushing the bottom of sealing section 28 of the vapor receiving system upward.

In operation, when the nozzle is not in use, interlock valve 45 assumes a closed position which means that vent tube 41 is closed so that if dispensing of gasoline is attempted, the venturi effect in the nozzle housing causes a vacuum to be created in a diaphragm chamber which cannot be relieved through vent line 41. This vaccum causes the diaphragm to disengage the actuation system for the main valve, thereby preventing dispensing of gasoline. Once the discharge spout 12 is inserted into a fillpipe, and the latching collar is properly positioned on the edge of the fillpipe, interlock valve 45 is then pressed into the open position by virtue of the weight of the nozzle itself on the valve. This permits the vent line to remain open, allowing it to operate as normal in its automatic shut-off function.

Use of such a design for an interlock valve system eliminates the need for any complicated valving systems involving actuation systems which will restrict the movement of the flexible bellows 27 and sealing section 28. This results in increasing the possibility of obtaining a tight seal against the fillpipe, thereby assuring optimum efficiency for recovering the vapors displaced from the vehicle fuel tank.

While a particular embodiment of this invention have been shown and described, it is obvious that changes and modifications can be made without departing from the true spirit and scope of the invention. It is the intention of the appended claims to cover all such changes and modifications.

The invention claimed is:

1. A nozzle for dispensing fluid which is designed to permit operation of the nozzle only when the discharge spout of the nozzle is properly inserted into the fillpipe inlet of the tank being filled, with the discharge spout being inserted in the fillpipe a predetermined distance and the lower side of the discharge [spount] *spout* being urged toward the inside of the fillpipe inlet, so that in the event the nozzle falls from the fillpipe, dispensing of fluid is immediately terminated, said nozzle comprising:

a. a nozzle housing;

b. a discharge spout, connected to the nozzle housing, for insertion into the fillpipe of the tank to be filled;

c. a main nozzle valve in the nozzle housing;

d. means for controlling the position of the nozzle valve for regulating the dispensing of fluid through the nozzle housing and discharge spout, said controlling means having an enabling position wherein the position of the main nozzle valve can be regulated and a disabling position wherein the main nozzle valve remains in or obtains a closed position; [and]

*e. an automatic shut-off system which acts in response to the liquid level in the tank being filled reaching the discharge end of the discharge spout, to place the nozzle valve controlling means in its disabling position by means of a vacuum deactivating the main nozzle valve, said vacuum being created by the closing of a vent line within said nozzle extending from the end of the discharge spout to the main nozzle valve; and*

[e.] *f.* interlock means, responsive to the discharge spout being inserted into the fillpipe a predetermined distance and the lower side of the discharge spout being urged toward the inside of the fillpipe inlet, for maintaining the controlling means in a disabled condition at all times *by closing said vent line* except when the discharge spout is inserted in the fillpipe inlet the predetermined distance and the lower side of the discharge spout is urged toward the inside of the fillpipe inlet, thereby assuring that the nozzle cannot *be operated* [operate] except when it is properly inserted in the fillpipe of the tank being filled and that its operation will be immediately terminated should the nozzle fall from the fillpipe.

2. The dispensing nozzle recited in Claim 1, wherein the interlock means comprises:

a. a movable member located below the lower edge of the discharge spout at a predetermined distance from the discharge end of the discharge spout, and mounted to the nozzle so that it can move toward and away from the discharge spout, said movable member having a first and second position wherein said member is closer to the discharge spout when in the second position [then] *than* when in the first position;

b. means for biasing the movable member to its first position, so that when the discharge spout is inserted in the fillpipe and the lower edge of the discharge spout is urged toward the inside of the fillpipe inlet, the movable member is moved toward the discharge spout, from its first to its second position; and c. means, responsive to the position of the movable member, for positioning the controlling means in its disabling position when the movable member is in its first position and positioning it in its enabling position when the movable member is in its second position, so that no liquid can be dispensed through said nozzle until the nozzle has been properly inserted into the fillpipe inlet with the movable member displaced to its second position.

3. The nozzle recited in claim 2, wherein the positioning means comprises:

a. an automatic shut-off system which acts in response to the liquid level in the tank being filled reaching the discharge end of the discharge spout, to place the nozzle valve controlling means in its disabling position, said shut-off system having, i. a pressure chamber located in the nozzle housing, ii. means for creating a vacuum in the pressure chamber in response to the flow of fluid through the nozzle, iii. a vent line connected between the pressure chamber and the discharge end of the discharge spout, for relieving the vacuum in the pressure chamber produced by the vacuum in the pressure chamber produced by the vacuum creating means, and iv. means, responsive to the pressure in the pressure chamber falling below a predetermined amount, for placing the nozzle valve controlling means in its disabling position; and b. means, responsive to the movable member obtaining its first position, for preventing fluid flow through the vent line so that the vacuum created in the pressure chamber by the vacuum creating means is not relieved and the pressure in the pressure chamber falls below the predetermined level, which moves the nozzle valve controlling means into a disabled position to prevent dispensing of fluid until the movable member reaches its second position, thereby indicating that the nozzle is then properly inserted in the fillpipe.

4. The nozzle recited *in* claim 3, wherein the movable member comprises a flat spring having one end secured to the discharge spout, such that its own inherent resiliency places its free end a predetermined distance from the lower side of the discharge spout for establishing its first position, said spring being positioned a predetermined distance from the discharge end of the discharge spout so that upon insertion of the discharge spout into the fillpipe the predetermined distance[,] *said* flat spring is moved to its second position when the lower side of the discharge spout is urged against the inside of the fillpipe inlet, either manually or by the weight of the nozzle itself.

5. The nozzle recited in claim 4, wherein the preventing means comprises an interlock valve mounted in the vent line in the discharge spout with its valve stem extending out of the discharge spout and communicating with the flat spring, said interlock valve having a closed position responsive to the flat spring being in its first position, whereby fluid flow through the vent tube is prevented, and having an open position responsive to the flat [sping] *spring* being in its second position, whereby fluid flow through the vent tube is permitted to allow the nozzle to be operated.

* * * * *